Oct. 27, 1959  O. B. SHAFER ET AL  2,910,685
BINARY TO DECIMAL TRANSLATOR
Original Filed Nov. 18, 1954  12 Sheets-Sheet 1

INVENTORS
ORVILLE B. SHAFER
WILLIAM S. ROHLAND

BY  J. K. Moser
AGENT

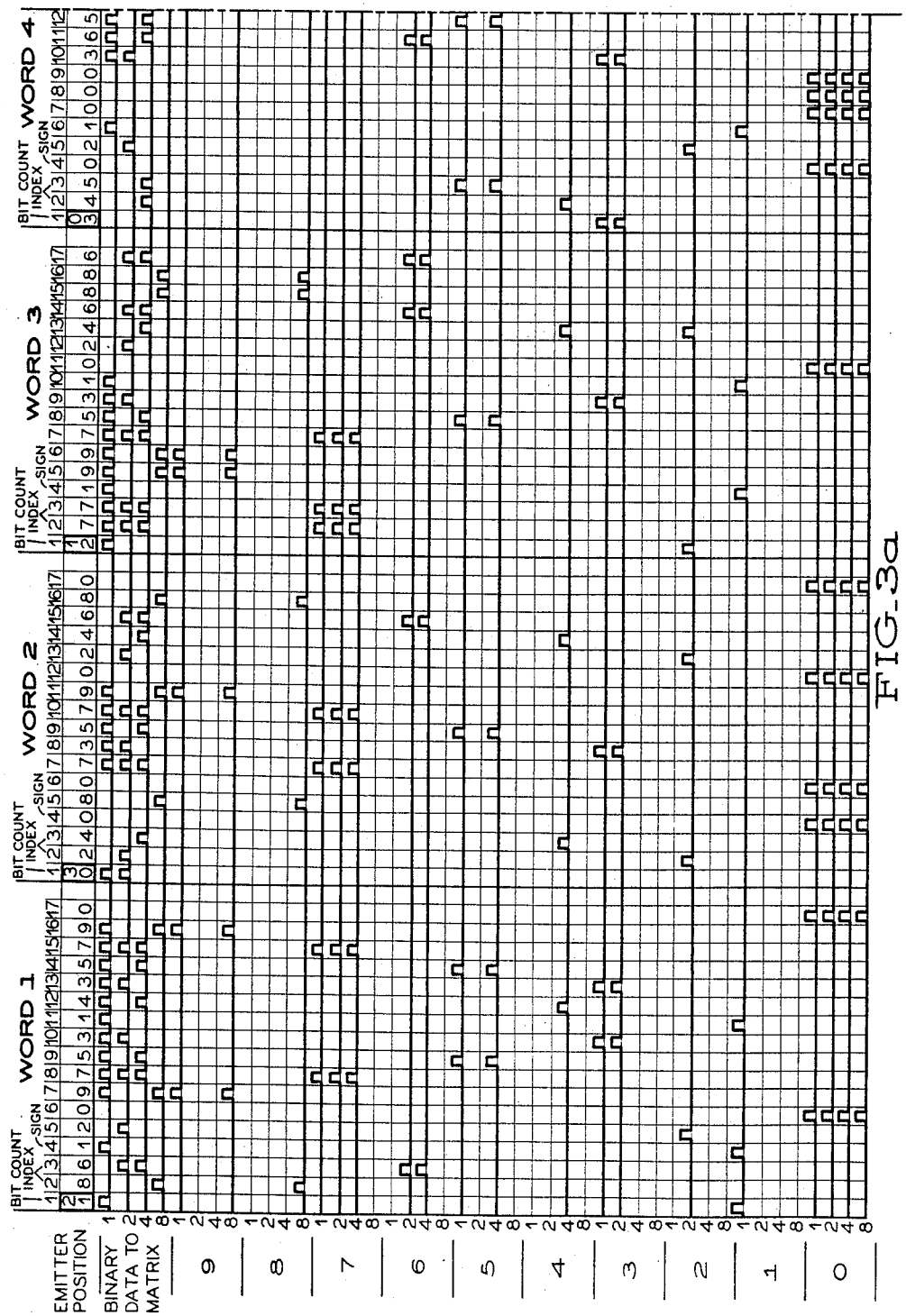
FIG_3a

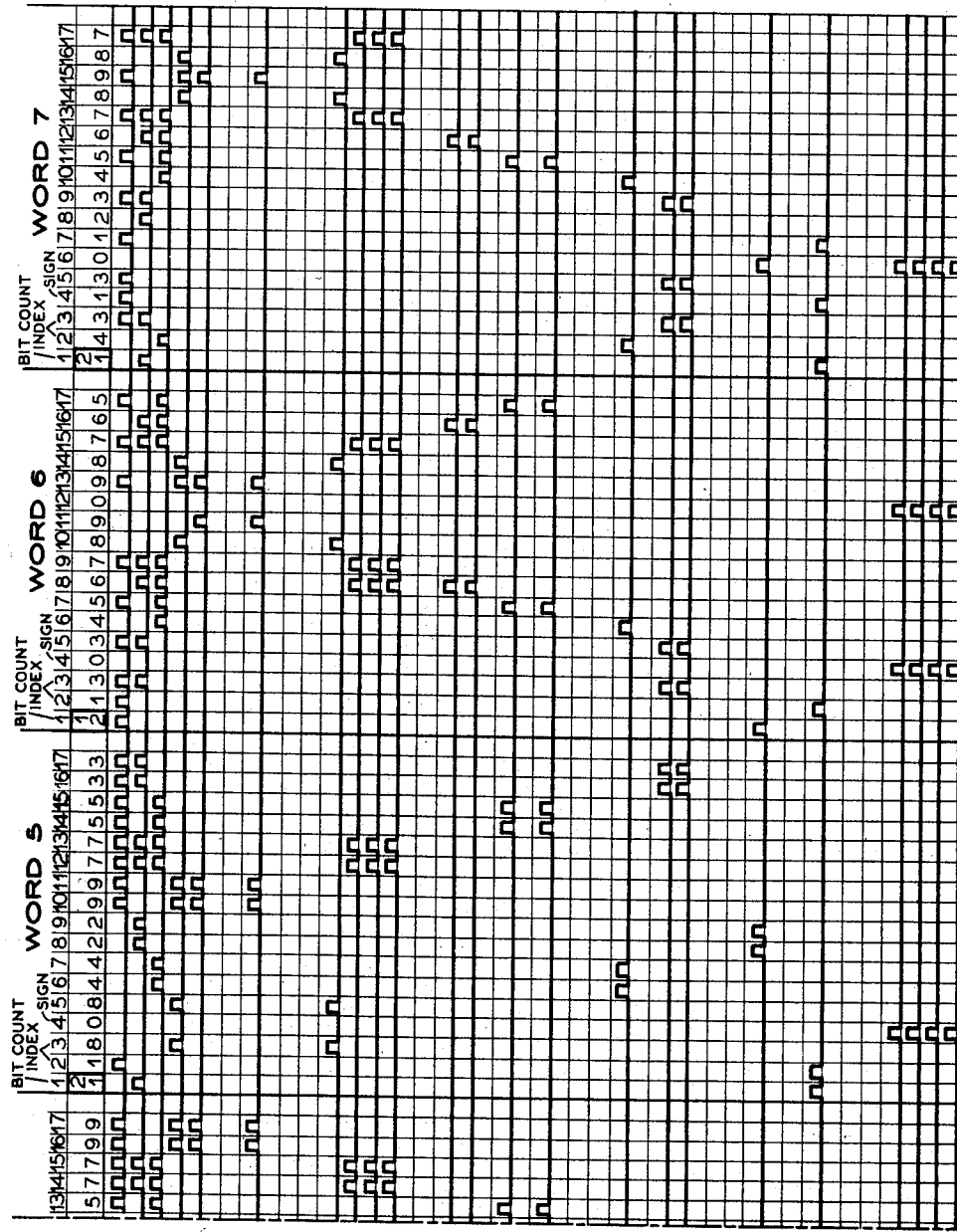
FIG_3b

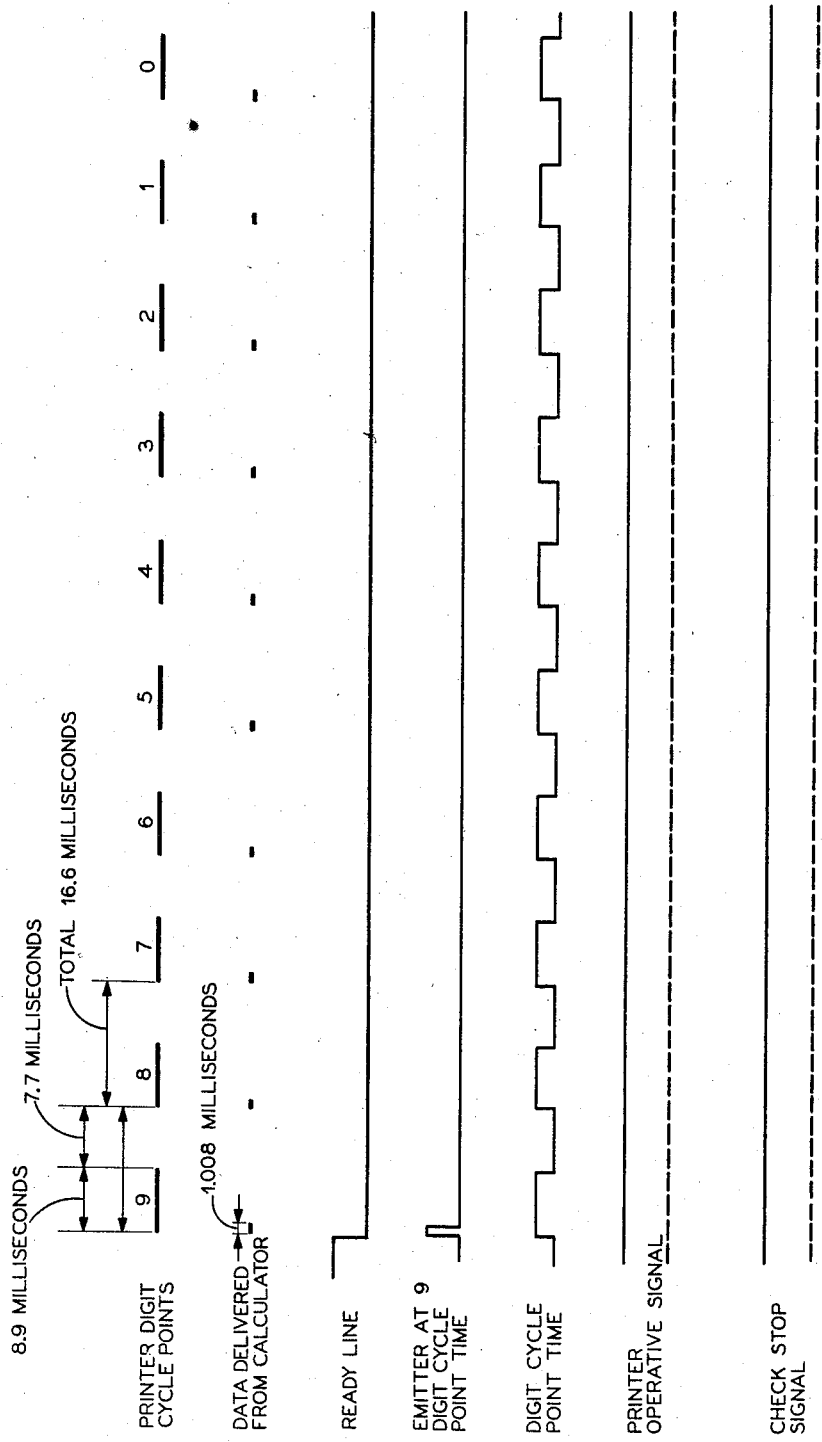
FIG_5

Oct. 27, 1959       O. B. SHAFER ET AL       2,910,685
BINARY TO DECIMAL TRANSLATOR
Original Filed Nov. 18, 1954       12 Sheets-Sheet 7
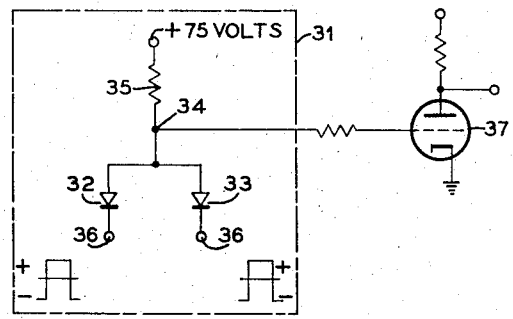
FIG_6a
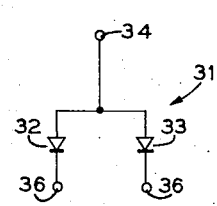
FIG_6b
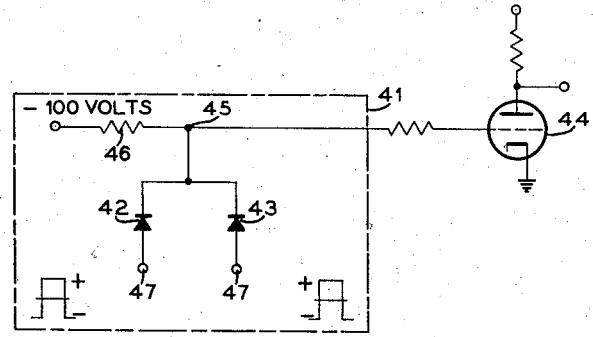
FIG_7a
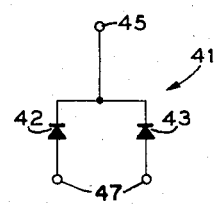
FIG_7b
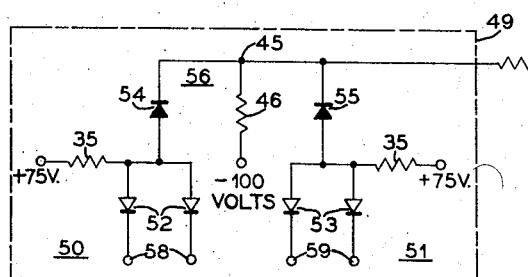
FIG_8a
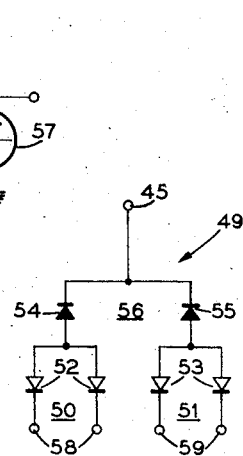
FIG_8b

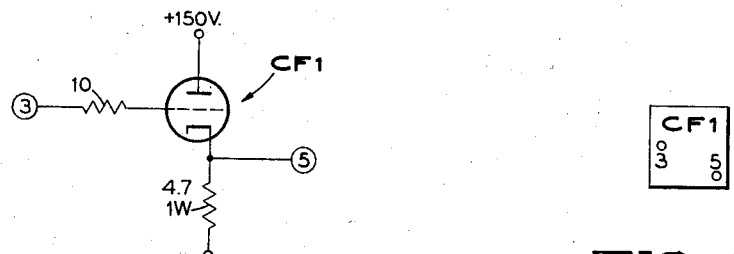
FIG_9a    FIG_9b
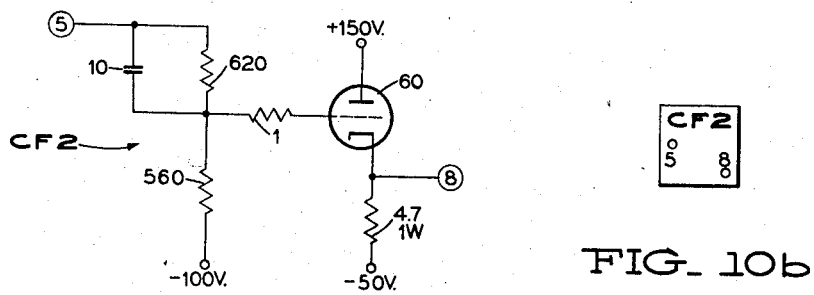
FIG_10a    FIG_10b

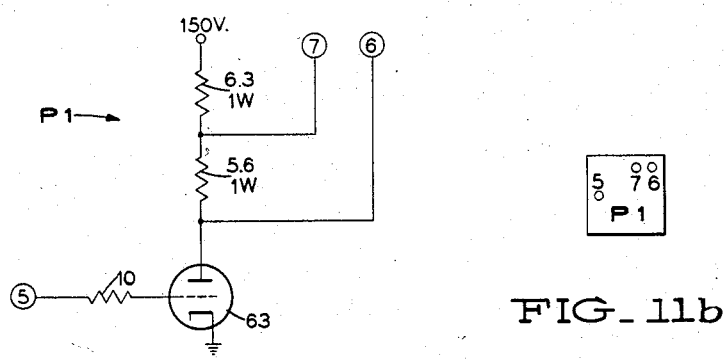
FIG_11a   FIG_11b
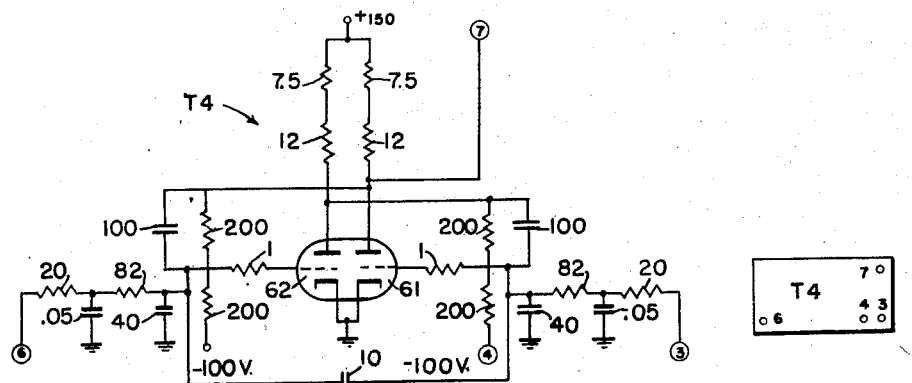
FIG_13a   FIG_13b
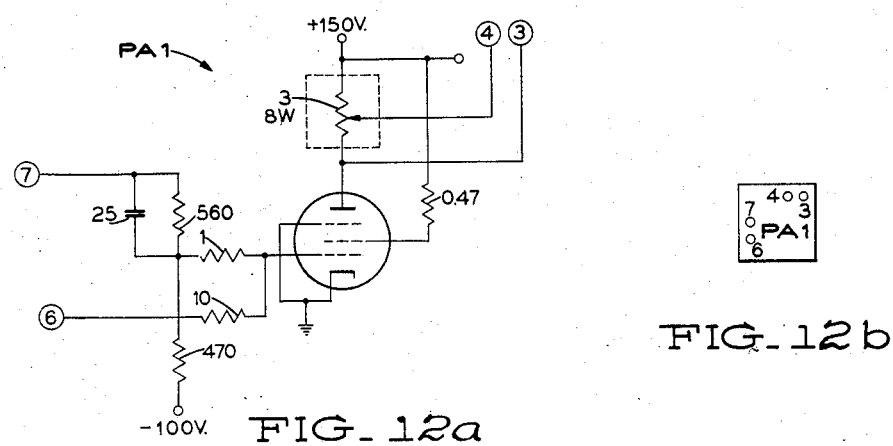
FIG_12a   FIG_12b Oct. 27, 1959    O. B. SHAFER ET AL    2,910,685
BINARY TO DECIMAL TRANSLATOR
Original Filed Nov. 18, 1954    12 Sheets-Sheet 12

PRINTER A CAM CONTACTS USE SUFFIX A
PRINTER B CAM CONTACTS USE SUFFIX B

United States Patent Office 2,910,685
Patented Oct. 27, 1959

2,910,685

BINARY TO DECIMAL TRANSLATOR

Orville B. Shafer, Owego, and William S. Rohland, Union, N.Y., assignors to International Business Machines Corporation, New York, N.Y., a corporation of New York Original application November 18, 1954, Serial No. 469,592. Divided and this application October 15, 1956, Serial No. 615,933

14 Claims. (Cl. 340—347)

This invention relates to data processing mechanisms and more particularly to data processing mechanisms which are capable of translating data delivered in one code to equivalent data in a second code.

This is a division of application Serial No. 469,592, filed November 18, 1954, entitled "Printer for Calculator Unit" and assigned to the assignee of the present invention.

In accordance with the invention, a differentially operable printing mechanism or machine of the type normally used for processing data recorded in tabulating cards is provided with a modified data processing means which receives the data to be processed a line at a time from an external source. Each line of data is divided into groups of words comprising a plurality of ordered positions, each having numeric characters 0 to 9, inclusive.

The data processing means includes a binary to decimal translator operated in timed relation with the normal machine digit cycle point positions. With a translator of this type, the entire line of data to be printed is serially delivered to the translator in binary code at each machine cycle point 9 through 0, however, only the binary coded pulses corresponding to the particular digit cycle point of the printing mechanism are accepted and serially transmitted from the translator as single pulses. All pulses, when selected, pass from the translator over a single conductor which in turn is connected to a word data switch forming a part of a print matrix comprising a group or array of tubes arranged in rows and columns to represent words and ordered positions in the word, respectively. The timing of the matrix is controlled by shift pulses delivered from the calculator to a closed fast ring for driving the columns which in turn drive an open slow ring for driving the rows. These two are interconnected so that at any point where coincidence occurs therebetween with a pulse received by the word switch from the translator that tube is fired. Firing of the tube energizes a print magnet connected thereto which in turn, after a mechanical delay, results in actuation of printing apparatus to cause the selected order in the word to initiate printing the desired numerical data or digit. As the machine moves to its next digit cycle point, the entire line of binary data is again delivered to the translator and the binary code for that cycle point is translated to its decimal value and transmitted in a like manner to fire the proper tube. In this manner the entire line is delivered to the translator once for each digit cycle point 9 through 0 or a total of ten times. At the end of the ten delivery operations, all binary stored data will have been delivered to the print matrix from which the printing means is actuated.

The setting up of all like digits in each word of the entire line corresponding to the digit cycle point of the printing mechanism is delivered serially but occurs substantially simultaneously. Thus, with the various digit cycle points moved from point to point in a consecutive manner, the corresponding digits are set up. After the last machine cycle point digits has completely set up and the proper delay for checking has transpired, the printing operation for the entire line of numeric information occurs substantially simultaneously.

In order to properly time the delivery of data to the translator, a control digit cycle point pulse or row signal is transmitted from the printer to the calculator or external source of information at each cycle point.

A bit count checking circuit is provided in the printer to insure the printing of the proper numeric data for each order in each word. The bit count value from the checking circuit representing a 4 modulus bit count remainder is compared with a similar bit count remainder delivered from the external source over the binary input lines to the translator along with each word.

Accordingly, it is one of the objects of this invention to provide a data processing line printing mechanism operated on machine digit cycle points 9 through 0 with a binary to decimal translator synchronized therewith which serially transmits all like numeric values at each cycle point 9 through 0 to operate the printing mechanism.

It is another object to provide a data processing printing mechanism operated on machine digit cycle points 9 through 0 to print an entire line.

It is another object to provide a binary to decimal translator for receiving an entire line of numeric data having varying digits with a single output line and a decimal type emitter operated consecutively from 9 through 0 which serially receives the entire line of data at each digit position.

It is yet another object to provide a binary to decimal translator for serially receiving an entire line of numeric data having varying digits with a single output line and a decimal type emitter operated consecutively from 9 through 0 which serially transmits the decimal equivalent of the binary value at each digit position over the single output line.

Other objects of the invention will be pointed out in the following description and claims and illustrated in the accompanying drawings, which disclose, by way of examples, the principle of the invention and the best mode, which has been contemplated, of applying that principle.

Figs. 3a and 3b taken together, with Fig. 3a to the left of Fig. 3b, comprise a timing diagram showing a group of words and ordered positions which comprise a line of numeric data or information.

Figure 4A:
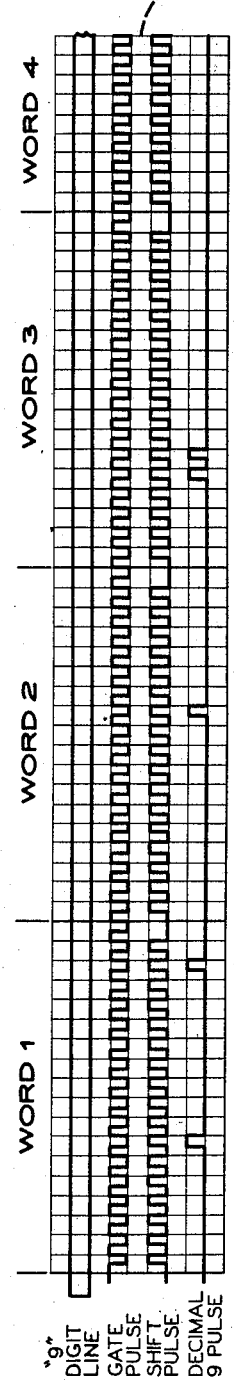
Figure 4B:
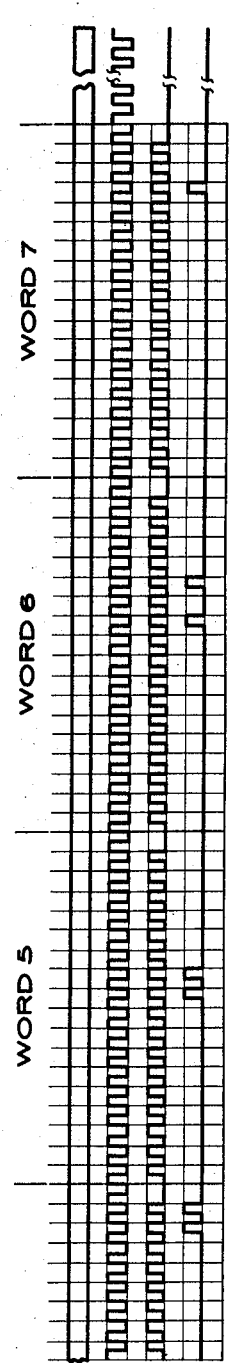

Figs. 4a and 4b taken, with Fig. 4a to the left of Fig. 4b, comprise a timing chart of a single machine cycle point of the printer with the relative position of the translated data at that cycle point in the form of serially spaced pulses delivered by the translator.

Fig. 5 discloses a timing diagram showing the various cycle points 9 through 0 and the pulses generated to indicate the printer is ready to accept data from the external source.

Figs. 6a, 6b, 7a, 7b, 8a and 8b diagrammatically show various types of diode coincidence switches or "and" circuits and diode mixes or "or" circuits used in the translator circuit.

Figs. 9a, 9b through 13a and 13b are schematic representations of tube circuit elements which are shown in the various block diagrams as used in the translator circuit.

Figure 14:
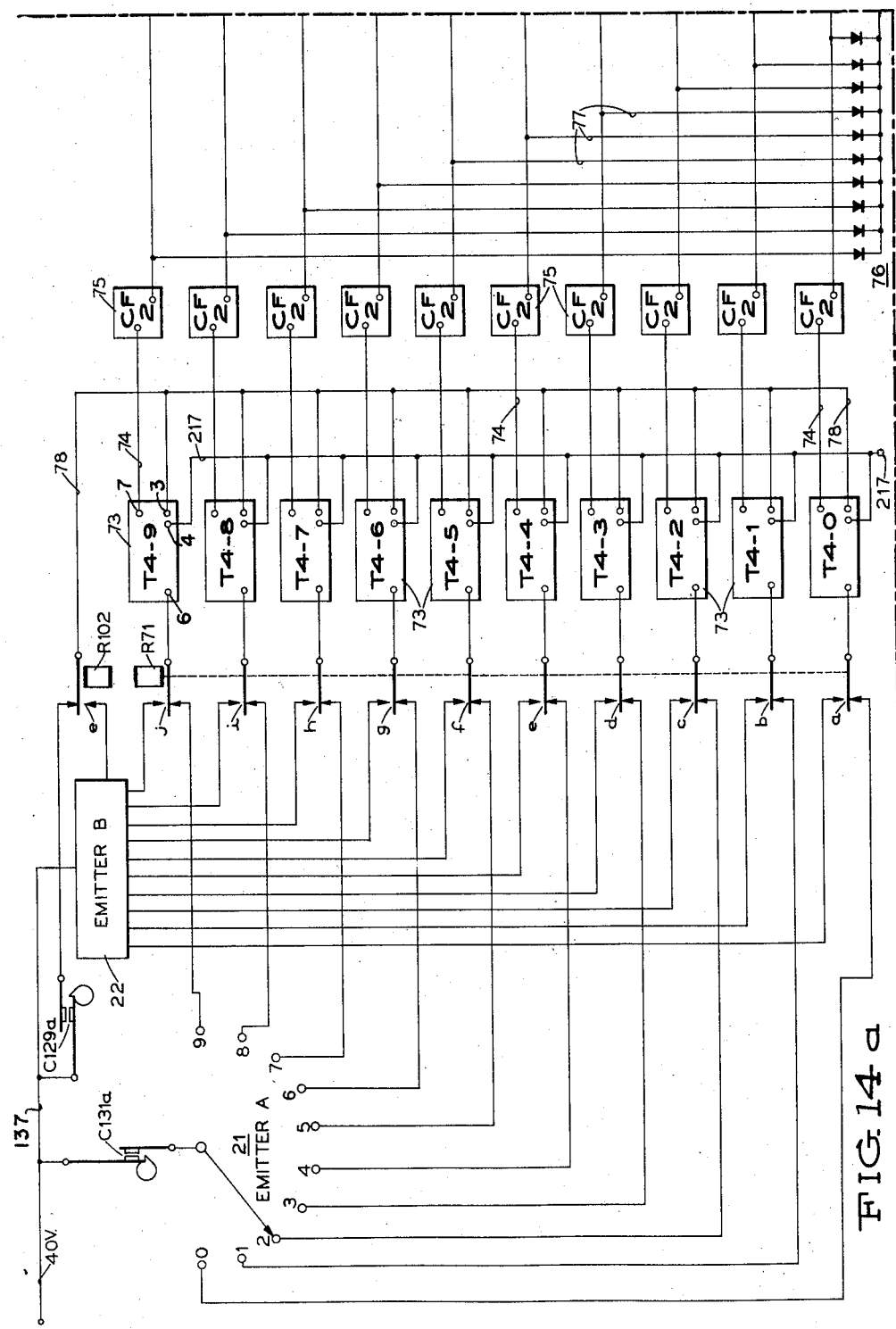
Figure 14B:
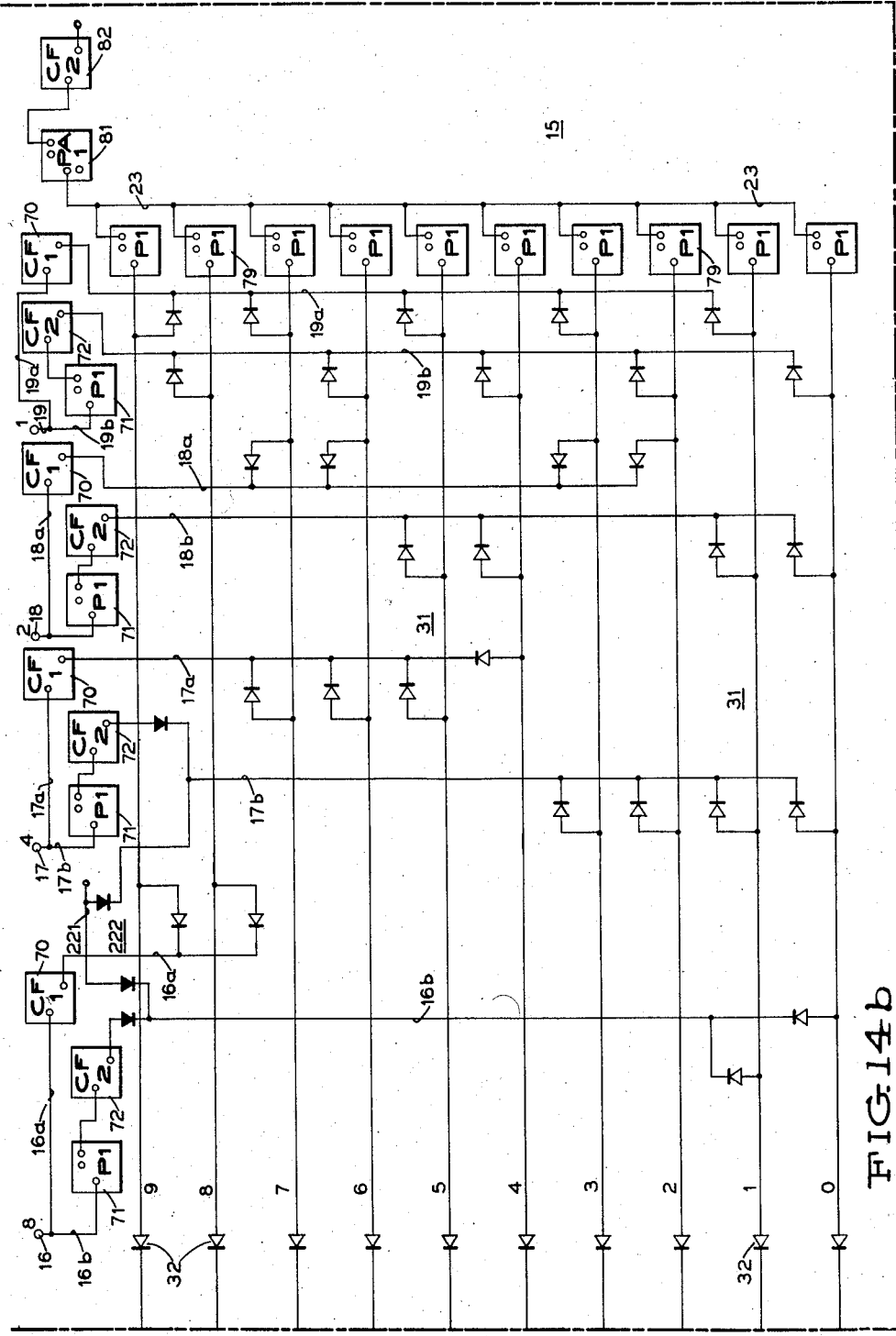

Figs. 14a and 14b taken together, with Fig. 14a to the left of Fig. 14b, comprise a wiring diagram for translating the data delivered from the calculator from a first to a second code.

Figure 16:
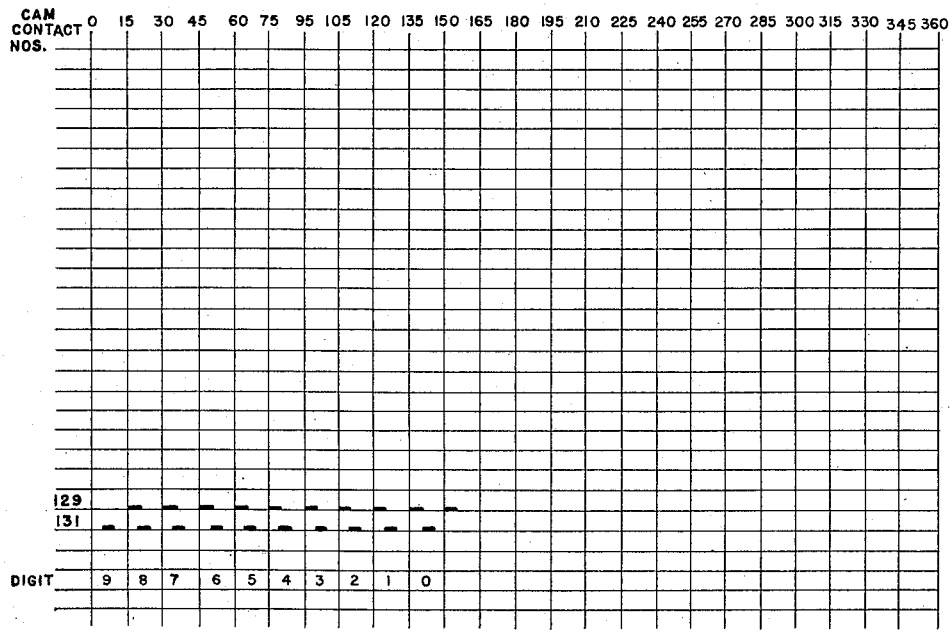
Figure 15:
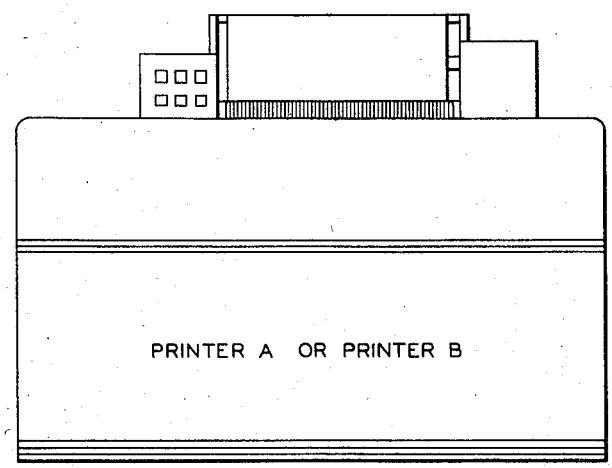

Fig. 15 is a schematic view of the line printer incorporating the improved control, and Fig. 16 is a timing chart for the cam operated contacts or circuit breakers used for the translating operations.

*General description*

A pair of printers, hereinafter referred to as printer A and printer B, are designed to print data received from a storage device in a calculator or the like (not shown) and to generate a bit count from the data printed and compare it with the bit count transmitted from the storage device.

The printers are mechanically alike and comprise two separate electromechanical print units, each with its own print control and carriage circuits. The electronic circuits for the control of the printing circuits and the bit count circuitry is common to both machines. This arrangement is possible because simultaneous printing is not a requirement of the printers.

Figure 1:
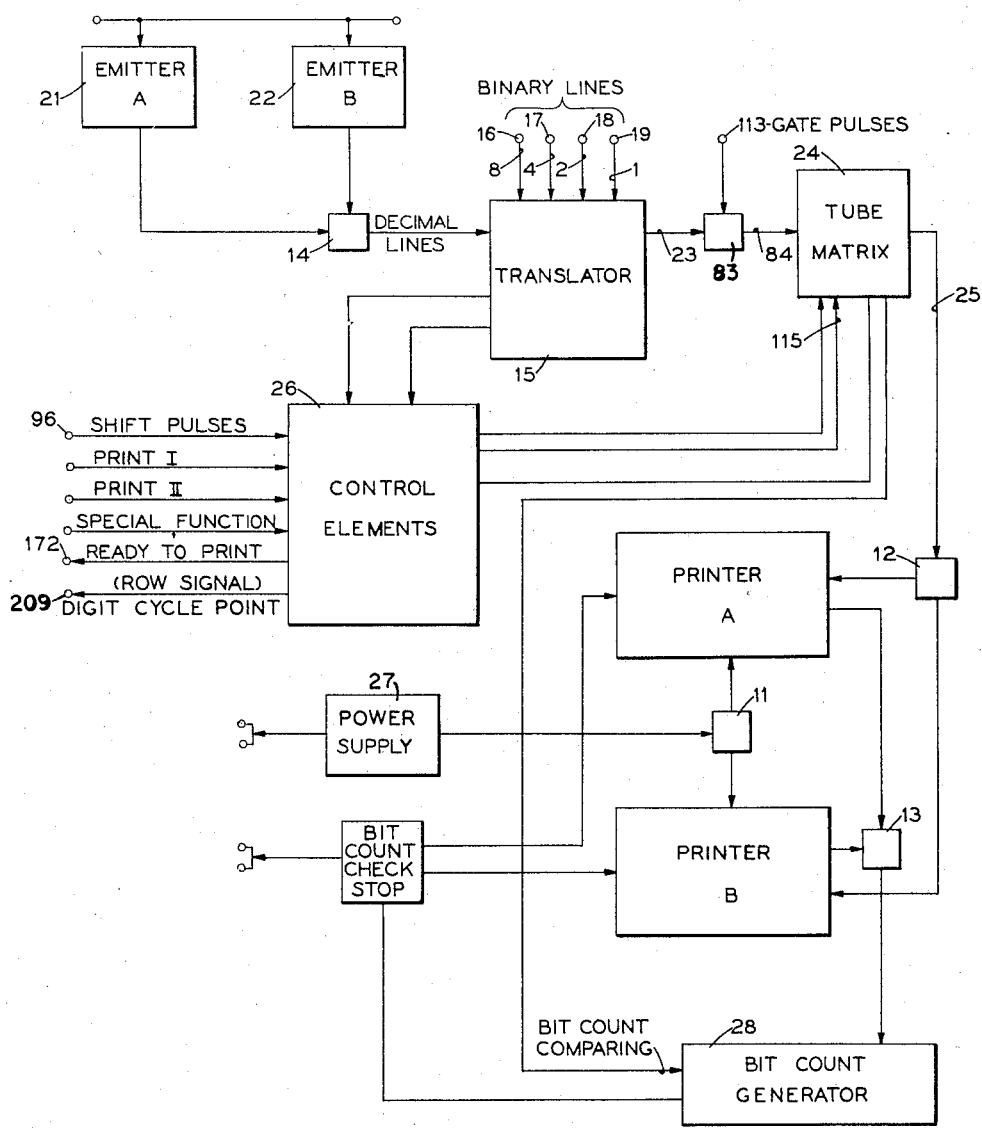
Fig. 1 shows an over-all block diagram of the line printers and the improved translator means therefor.

Referring now to the drawings, there is shown in Fig. 1 a schematic block diagram of the general arrangement and interconnections of the various units comprising the improved printer control. The direction of flow of numeric information or data and various control signals between the units is indicated by arrowheads on the interconnecting conductors. Since Fig. 1 comprises a simplified representation of the improved printer control, it will be appreciated that a single conductor may represent a multiple number of conductors and allied circuitry.

As shown, there is represented the pair of printer mechanisms or units A and B, respectively, which, in this instance, are line printers of the type capable of printing an entire line at each machine cycle, interconnected by switch means 11, 12, 13 and 14 which are selectively actuated to channel information or signals to and conduct signals from the selected printing unit A or B.

In order to direct the proper signal or data to the printer, there is provided a combinational code translator capable of translating from one code to another. In this embodiment a binary to decimal translator unit 15 of the serial type is provided which receives a full line of information in the form of electrical pulses over binary 8—4—2—1 input lines 16, 17, 18 and 19, respectively. These lines are connected to a suitable storage device which may form a part of a calculator (both of which are not shown).

The translation of this binary information or data into decimal form is under the control of print A or print B emitters 21 or 22, respectively, which are selectively connected to the translator by the switch means 14. The emitters are mechanically connected (not shown) to their respective printers A or B and moved in synchronism with the cycle points in the printer cycle. These emitters, when operated, function to selectively cooperate with the translator to translate the proper binary pulses to a corresponding decimal value and permit the flow of all information or data serially in the nature of electrical pulses along a single line 23 to a suitable matrix 24. This matrix, Fig. 2, includes a pair of rings and a group of gas tubes arranged in rows and columns (not shown in detail). Each row represents a group of ordered positions defined as a word with each word forming a part of a line of typed numeric information and each column represents an ordered position in each word. The sum of the rows or words represents an entire line of typed information. Whenever coincidence of pulses occurs between a particular row and column and the translator, the gas tube at this point is fired which in turn operates mechanism in the selected printer A or B through line 25, Fig. 1, to set up the printing of the numeric value selected.

The emitters 21 and 22 are so arranged as to move consecutively from a 9 machine digit cycle point through a 0 cycle point in accordance with the printer operating characteristics. At each cycle point the entire group of words forming the line are serially transmitted to the translator 15 from the storage device. However, only the decimal value of the binary code corresponding to the cycle point position of the emitter is transmitted to the matrix 24. As the emitter reaches each different cycle point and is ready to again receive the same information, a row or digit cycle point signal is transmitted to the storage device or calculator advising that the printer is now ready to receive the same information; however, at this time the numeric value to be separated and translated is of the next lower digital value.

Various pulses both received and delivered from a group of control elements or means 26 are provided to properly time the operation of the printer and delivery of data. A suitable source of power 27 is provided to operate the printer and other necessary apparatus.

In order to insure a checking means between the numeric information received by the translator 15 and that printed, a printer bit count generator and comparing device 28 is provided. This device is so arranged as to respond to the printing mechanism and operates on a suitable modulus corresponding to the bit count transmitted with each word over the binary code 1 and 2 lines 19 and 18, respectively. If the bit count generated for each word is correct, it will compare with the bit count transmitted by the storage device and this correct bit count permits operation of the printer and the delivery of the next line of numeric data to the printer. The detailed description of the printer mechanism and associated circuitry is shown and described in the above O. B. Shafer et al. application Serial Number 469,592.

*Tubes and control switches*

In each of the drawings of the various control devices, the individual components or units making up that device are indicated merely as a box or block. The detailed circuitry of each such block will be presently described as applied to various typical forms of tubes and diode circuits which are shown diagrammatically in Figs. 6a to 24b.

In Fig. 6a, for example, there is shown a typical coincidence switch, otherwise known as a logical "and" circuit or diode switch 31 comprising a pair of germanium crystal diodes 32 and 33. A common terminal 34 of the diodes 32 and 33 is connected through a voltage-dropping resistance 35 to a positive 75 volt source (not shown). The diodes 32 and 33 each include an individual input terminal 36, both of which are normally biased negatively so that the common terminal 34 is normally at a negative potential with respect to ground. If coincident positive pulses are applied to both input terminals 36, the potential of the terminal 34 is raised. However, if only one of the input terminals is pulsed positively, the potential of the common terminal 34 is not raised appreciably. A voltage responsive device, such as a suitable electron tube amplifier 37, is controlled by the potential of the terminal 34 to furnish a usable output voltage pulse whenever a coincidence of positive input pulses is detected. For simplicity in the drawings, the portion of the coincidence switch shown in the broken line rectangle 31 in Fig. 6a is generally represented as shown in Fig. 6b. This representation omits the dropping resistor 35 and the connection to the positive voltage source. While in the diagram only two germanium crystal diodes and input terminals 36 are shown, it is to be understood there are frequently more than two diodes incorporated in the diode switch. With any suitable number, the switch operation is identical when positive coincidence occurs at each input terminal.

In Fig. 7a there is shown a typical mixer, otherwise known as a logical "or" circuit or diode mix 41, comprising a pair of germanium crystal diodes 42 and 43. The diodes which are employed in mixers are shaded and the direction reversed in the present drawings to distinguish them from the diodes which are employed in the switches. A voltage responsive device, represented by an electron tube amplifier 44, is controlled by the potential of a common output terminal 45 of the diodes 42 and 43, which terminal is connected by a suitable resistor 46 to a negative 100 volt source (not shown) to normally maintain a negative bias in the grid of the tube 44. Each diode is connected to an individual terminal 47 which in turn are connected in the electrical circuit. If either one (or both) of the diode input terminals 47 is pulsed positively, the potential of the terminal 45 is raised which permits the tube associated therewith to conduct. For convenience, the portion of the diode mix or "or" circuit shown in the broken line rectangle 41 in Fig. 7a is generally represented in the drawings as shown in Fig. 7b. This representation omits the resistor 46 and the connection to the negative voltage source. As in the diode switch diagram, it is to be understood the diagram representation of the diode mix 41 may involve more than the two diodes and input terminals 47 and that each additional input terminal 47 will be provided with an additional diode, such as the diodes 42 and 43 of Fig. 7a and that the cathode of each of these additional diodes will be connected to the common terminal 45.

In Fig. 8a there is shown a typical circuit arrangement 49 wherein a pair of separate diode switches 50 and 51, respectively, each comprising a pair of germanium crystal diode switches or "and" circuits 52 and 53, respectively, feed through their respective diode mixer diodes 54 and 55 forming part of a diode mix circuit 56 to the voltage responsive device represented by the electronic amplifier 57. A coincidence of positive voltage pulses at input terminals 58, or at input terminals 59 causes the grid voltage of the tube 57 to rise to permit the tube to conduct. Fig. 8b illustrates the simplified showing of the diode network as used in the drawings. As in the previous diode arrangements, any number of diodes in both the diode switches or diode mixes may be incorporated in the switching circuit.

Referring momentarily to Figs. 14a and 14b, which represents the diagram of the translator control circuit, each of the component blocks or units, comprising a particular tube circuit, is labeled with a letter in combination with a number. By referring to Figs. 9a to 13a, inclusive, the respective detailed circuitry of any component block may be determined by identifying the letter-number block designation. Each of the particular letter combinations, in the component block, in addition to acting as a reference designation, also denotes the function of the component. Thus, the units shown in Figs. 9a and 10a, for example, are cathode followers, and are accordingly labeled with the prefix letters CF; the unit shown in Fig. 11a is a power unit or inverter and is accordingly labeled with the prefix letter P; the unit shown in Fig. 12a is a power amplifier unit and is accordingly labeled with the prefix letters PA; the unit shown in Fig. 13a is a trigger unit and is accordingly labeled with the prefix letter T.

Before proceeding with a description of the various control circuits or devices of the printer, a brief description of representative ones of the detailed circuit units or components, Figs. 9a through 13a, utilized in these control circuits will be given. In each of the unit diagrams and other circuit diagrams, the values of the various resistors utilized therein are labeled in thousands (K) of ohms, while the values of the various capacitors are indicated in micro-microfarads. Hereinafter, in this specification wherein a conductor or a circuit terminal or the like is referred to as being shifted positive or negative in potential, this does not necessarily mean that the point, in question, is positive or negative in an absolute sense, but only more positive or more negative, relative to its previous state. This principle also applies to any description wherein positive and negative pulses are mentioned.

Referring now to Figs. 10a and 10b, the unit CF2 comprises a triode vacuum tube 60. In actual practice this may be of a dual triode—Type 5965. The grid of the triode is connected through a 1K and a series 560K ohm resistor to a negative 100 volt supply. The cathode of each triode is respectively connected through a 4.7K ohm 1 watt resistor to a negative 50 volt supply and the anode or plate of the triode section is connected to a positive 150 volt supply. The 1K resistor of the triode is also connected, via a 620K resistor, in parallel with a 10 micro-microfarad condenser, to an input terminal 5. The output of the triode is taken from terminal 8 connected to the cathode side of the 4.7K resistor. The input terminal 5 is connected to a switching potential, which is either at a potential of positive 150 volts or positive 50 volts. With positive 150 volts on terminal 5, the associated grid is maintained at such a potential that the tube current is at a maximum and accordingly the cathode terminal 8 is at a maximum positive potential of plus 25 volts. With a positive 50 volts on terminal 5, the associated grid is maintained at such a potential that the tube current is at a minimum and accordingly the cathode terminal 8 is at a minimum negative potential of approximately 18 volts. Thus, a shift of potential on the terminal 5 effects a corresponding in-phase shift of potential of the output terminal 8. This well-known type of tube action is referred to as cathode follower action.

It will be noted that the cathode resistor of the triode is of relatively low value. As a result, the cathode output terminal serves as a low impedance signal source. A low impedance signal source may be "loaded" appreciably without substantially affecting the magnitude of the signals supplied therefrom. This is the main purpose of a cathode follower unit. The capacitor, shunting the 620 input resistor, is to rapidly apply the voltage shift of the input terminal 5 to the grid, so that the resultant shift in potential, of cathode terminal 8 does not appreciably lag the input voltage.

The cathode follower unit CF1, shown in Figs. 9a and 9b functions in essentially the same manner as cathode follower unit CF2, although it does not include the 100 volt negative bias on the grid and the magnitude of the switching voltages may differ. The differences in resistor values is to provide proper power for different requirements. In the drawings the blocks shown in Figs. 9b and 10b are shown for simplification of the wiring diagram and represent the tubes, 9a and, 10a, respectively.

Referring now to Figs. 11a and 11b, an inverter or amplifier unit P1 comprises a triode 63, Type 5965, having its cathode connected to ground. An inverter, as its name implies, is adapted to simply invert a signal. Thus, if the grid terminal 5 shifts positive, the triode conducts more heavily and the associated plate output terminals 6 and tap 7 shift negative. Similarly, if the grid terminal 5 shifts negative, the terminals 6 and 7 shift positive.

Power amplifiers or units effect 180° signal inversion of an applied signal so that they may also be classified as inverters. However, they differ from the inverter units, which are primarily voltage devices, in that they can supply considerable power to the circuits to which they are connected. In Figs. 12a and 12b, a unit PA1 comprises a pentode tube, Type 6AQ5, wherein the application of a positive signal to the grid input terminals 6 or 7 through the related resistors results in an inverted output signal on the plate terminal 3 and the variable tap 4.

Referring now to Figs. 13a and 13b, a trigger unit T4 is shown and comprises two retroactively coupled triode sections 61 and 62, respectively, of a Type 5844 vacuum tube. By proper selection of circuit components, the unit T4 is so arranged that only one of the triode sections is conductive, at a time, in accordance with well-known trigger operation. With the right-hand triode 61 conducting, the trigger is defined as being in an Off position. With the trigger Off, the tap terminal 7 of the right-hand triode 61 is at some potential below the supply positive potential of 150 volts due to the current being drawn through the right-hand triode. As a result, voltage sensitive circuits which may be connected to terminal 7 are accordingly controlled. With the trigger Off, as assumed, the plate of the nonconducting left-hand triode 62 is at the positive supply potential of 150 volts.

With the left-hand triode 62 conducting, the trigger is defined as being in an On condition. With the trigger On, the plate of the left-hand triode 62 is at a low potential, while the terminal 7 of the right-hand triode is at a positive 150 volts. With the shift of potential of terminal 7, associated circuits are accordingly controlled.

The trigger T4 is designed for control by cam contacts in the printer and is desensitized inasmuch as it is always operated with independent inputs. Triggering is accomplished by applying a positive 40 volts to the trigger grids through 20K and 82K coupling resistors. A .05 mfd. bypass capacitor is placed at each of the inputs of this trigger between the 20K and 82K resistors. With the external bypass capacitor between pins 3 and 6 and ground, this trigger will not recognize a pulse of less than approximately two milliseconds duration. However, once the triggering action starts, triggering is very rapid. The time constant of the resistor-condenser combination consisting of a 20K resistor and .05 mfd. capacitor determines the minimum pulse duration which will be recognized by the trigger. The reason for this bypass is to prevent operation of the triggers by transient voltages. Also, a 10 mmfd. capacitor connected across the grids between the 82K and 1K resistors eliminates any tendency for trigger operation by transient conditions which may develop in the system.

In order to provide a reset for all triggers, the 4 terminal is momentarily connected to a positive potential over a conductor 217, Fig. 14a.

Hereinafter in this specification wherein a trigger is mentioned, the trigger is defined as being Off if the right side triode 61 is conductive, or On if the left side triode 62 is conductive.

In the foregoing description of the tubes, it is to be understood the resistors and capacitors may be varied within limits or even different type tube circuits employed. These figures are presented as a means for accomplishing the desired result.

*Binary to decimal translator*

Figure 2:
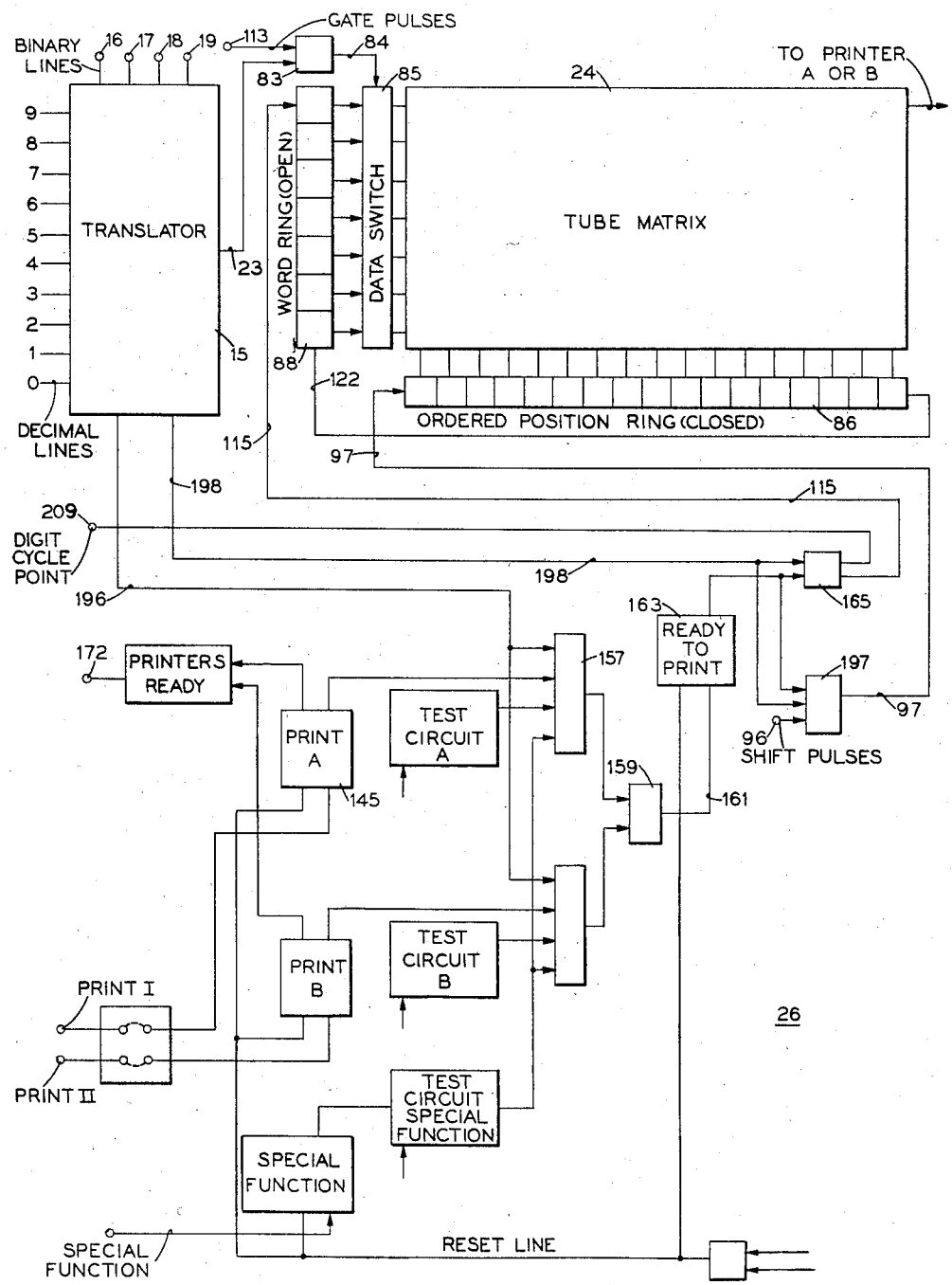
Fig. 2 is a block diagram of the control section for the printers in more detail.

Referring now to Figs. 2, 14a and 14b, there is shown a data receiving and processing arrangement or circuitry for serially receiving a group of words in binary 1—2—4—8 code. Each word comprises a plurality of ordered positions, 16 in the embodiment disclosed, each having numeric values 9 through 0, and a group of seven words when combined form a line of numeric data or information to be printed, Figs. 3a and 3b. The complete line of data of seven words is serially transmitted from a suitable storage source in a calculator or the like (not shown) to the binary to decimal translator 15 over the binary code 8—4—2—1 lines 16, 17, 18 and 19, respectively, Figs. 1, 2 and 14b. Each of the binary lines includes a CF1 cathode follower 70 whose output, along lines 16a, 17a, 18a and 19a, respectively, provides an increase in positive potential whenever the associated binary line is rendered positive. Any positive output from the cathode followers is impressed on a plurality of parallel decimal value lines 9 through 0 through appropriate germanium crystal diodes forming a part of diode switches or "and" circuits 31. The decimal 9 through 0 lines represent the numeric or digit value of each order. As shown, the output side of the cathode follower CF1 in binary line 16a is connected to the 9 and 8 decimal lines; the output of CF1 in the binary line 17a is connected to the 7, 6, 5 and 4 decimal lines; the output of CF1 in the binary line 18a is connected to the 7, 6, 3 and 2 decimal lines; and the output of CF1 in the binary line 19a is connected to the decimal 9, 7, 5, 3 and 1 lines.

Connected in parallel with each cathode follower CF1 line is a second line 16b, 17b, 18b and 19b, respectively, connected to the decimal 9 through 0 lines in a suitable manner and each line includes a P1 amplifier tube 71 and a CF2 cathode follower 72 connected in series. The last-mentioned lines are rendered positive by the P1 tube whenever the associated binary line is negative and may, for the purpose of this description, be called the no 8, no 4, no 2, and no 1 lines, respectively. These lines are connected to the decimal 9 through 0 lines in the following manner. Line 16b is connected to the decimal 1 and 0 lines; line 17b is connected to the decimal 3, 2, 1 and 0 lines; line 18b is connected to the decimal 5, 4, 1 and 0 lines; and line 19b is connected to the 8, 6, 4, 2 and 0 decimal lines. These lines extending from the P1 power tubes provide a continuous positive potential to the diodes in their respective lines whenever the potential at their respective binary lines is negative.

In series with the 9 through 0 decimal lines are the pair of printer A and B emitters 21 and 22, respectively, Fig. 14a. These emitters are mechanically driven (not shown) by the printer in synchronism with the machine digit cycle points. The emitters are moved from the 9 through 0 digit cycle points once for every machine cycle of 360°, and in this embodiment this takes place from 0° to 150° of the machine cycle.

As the emitter 21 moves from 9 to 8 through 0 consecutively, a cam operated contact C131a timed with the machine index provides timed positive pulses to each line consecutively. The timing operation of the cam contact C131a is shown in Fig. 16. The B printer emitter 22, Fig. 14a, represented by the box is identical in operation as the A emitter 21 and involves the same elements.

The decimal lines 9 through 0, extending from both emitters are selectively connected to the operating points a through j of a relay R71. Under normal conditions the 9 through 0 lines from the emitter 21 connect with the operating points of relay R71 at the normally closed contacts R71a to R71j, inclusive. Extending in series with each operating point of these switches is a normally Off T4 trigger 73, the output terminal 7 of each being connected by a conductor 74 to the grid of a related CF2 cathode follower 75 whose output in turn leads to a diode 32, Fig. 14b, forming a part of the diode switch unit 31 for each decimal line 9 through 0. Thus, it can be seen that with the emitter 21, Fig. 14a, located at any digit cycle point, when the circuit is completed by the cam contact C131a the related trigger T4 is turned On by the emitter pulse of 40 volts pulsing the left-hand grid at the 6 terminal and the opposite side of the trigger goes positive. This drives the related cathode follower 75 to apply a positive voltage to the related diode 32 in the switch and conditions that line for the reception and transmission of a binary line pulse when received from the external storage source. At the time any of the above cathode followers CF2 go positive, this positive pulse is also supplied to a diode mix or "or" circuit 76 through a plurality of lines 77 for reason which are explained in the Shafer application Serial Number 469,592.

As mentioned, when the emitter reaches the beginning of any cycle point, the appropriate trigger T4 is turned On. After the emitter moves from this cycle point and before it reaches the next digit cycle point, a second timed pulse supplied by a cam contact C129a is transmitted through the normally closed point e of a relay R102 via a conductor 78 to the 3 terminal of the On trigger to turn the same Off. Thus this line is no longer positive and no further data will be accepted. The timing operation of the cam contact C129a is shown in Fig. 16. As the emitter moves to the next cycle point position the next trigger T4, Fig. 14a, is turned On and the same sequence of events occur. All operations from 9 through 0 occur consecutively.

The output or opposite side of the 9 through 0 decimal lines are each supplied with a P1 amplifier 79, Fig. 14b, the output of each being connected to the common line 23. This line carries a PA1 power amplifier 81 connected to the grid of a CF2 cathode follower 82 to provide a positive pulse at a diode switch 83, Fig. 2, when positive pulses are applied to any of the amplifiers 79 in the decimal lines 9 through 0, for reasons to be hereinafter described.

From the foregoing, it can be seen only the decimal line the emitter is contacting is rendered partially positive, and it is thus the only line capable of transmitting or gating a pulse to the line 23, Fig. 14b, when the proper pulse or combination of pulses are delivered from the external source or storage device.

With the above arrangement, assuming the emitter is at the decimal 9 line, it requires simultaneous positive pulses over the 8 and 1 binary code lines, corresponding to a decimal 9 to cause the entire 9 line to go positive at its diode switch 31 and operate its respective amplifier 79 to provide a negative pulse at the line 23. Since the binary values are delivered in parallel for each digit but serially for successive digits over various combinations of the 4 binary lines, all pulses, except those arriving simultaneously on the binary 8 and 1 lines 16 and 19, respectively, do not pass beyond the translator. With the emitter at the next or 8 digit cycle position only those pulses arriving singly on the binary 8 line permit the decimal 8 line to rise in potential beyond its diode switch 31.

It is to be noted that in order to avoid the interception or reading of a binary 8 and 1, which is a decimal 9, as a decimal 8, the amplifier 71 in the absence of a positive pulse in the binary 1 line 19b maintains this line and thus a portion of the decimal 8 diode switch positive to permit the decimal 8 line to go positive whenever a single pulse is received on the binary 8 line. However, the amplifier 71 in the line 19b will drive the 8 line negative when a simultaneous binary 8 and 1 pulse is received. This rejects both pulses at the decimal 8 line. The decimal 8 line will stay down until the positive value drops on the binary 1 line 19, after which the absence of a binary 1 pulse automatically raises the potential at the diode in the decimal 8 line. The same procedure is followed for all of the other digit cycle points involving the use of more than one binary line for conducting information. Decimal lines 9 and 7 are the only two which are not provided with a negative blocking pulse.

At 0 digit cycle point time, the decimal 0 line is rendered positive in the absence of a binary 1, 2, 4 or 8 pulse by means of the four power amplifiers 71, thus a pulse representing a zero is applied to the line 23.

*Word chart*

Referring now to Figs. 3a and 3b, there is diagrammatically shown a complete line of numeric data which is stored in a storage device of a calculator or the like. In this instance, the line includes 119 ordered positions which are to be transmitted to one of the printing units A or B to print the identical numeric values, with the exceptions to be described later, in the identical ordered positions.

For convenience each line is shown divided into seven words, each having sixteen ordered positions plus an order position at the beginning of each word for the bit count of its respective word and includes a space between each word to provide seventeen numeric spaces plus a blank. This is more clearly shown at the top of Figs. 3a and 3b where each space of each word is numbered 1 through 17. It will be noted the first position or space of each word is labeled Bit Count, the next two are labeled Index and the fourth is labeled Sign, which will be described later. With the bit count spacing removed, this leaves a total of 16 different ordered positions for each word or a total of 112 positions.

The second row of information represents numeric values 0 through 9 for each position which are arbitrarily established to more clearly describe the invention. At the beginning of each word there is a pair of numbers enclosed in a box. Each lower number represents the actual bit count remainder for the numeric values of that word based on a 4 modulus.

While the numeric values of each word are actually stored in a suitable storage device in binary 1—2—4—8 code in any suitable manner and are serially delivered in the form of pulses along the binary 1—2—4—8 lines to the translator 15, the machine digit cycle point time of the printer determines the earliest the data can be delivered to the translator. At the proper machine signal, the entire group of words or entire line of numeric data leaves the storage source as a series of pulses or combination of pulses parallel by bit, serial by digit as shown below the numeric values. These pulses represent the binary value for the numeric value directly above.

Assuming the printer is ready to receive the numeric data, the emitter 21, Fig. 14a, will be on the decimal 9 line and as all the pulses of the entire line of data pass to the translator, Fig. 14b, only those involving simultaneous pulses on the binary 8 and 1 lines, representing a decimal 9, raise the decimal 9 line to operate its related amplifier 79 to provide a negative pulse on the single line 23 and a resultant positive pulse at the diode switch 83, Fig. 2. As shown in Figs. 3a and 3b, the binary 9's at 9 cycle point time are separated in the form of positive pulses in definite timed relation corresponding to the ordered position of the numeric value. Since these pulses are not uniformly spaced, the line 23, Fig. 14b, when responding to the 9 position, is correspondingly varied at identical time intervals. The output from the line 23 conditions the diode switch 83, Fig. 2, in a predetermined manner to feed a series of positive pulses over a conductor 84 to a plurality of parallel diode word switches 85 in the matrix 24.

At 8 digit cycle point time, the decimal 8 line is ready and a signal is transmitted to the storage device and the entire line of data or group of words is again delivered to the translator 15, Fig. 14b, however, in this instance only the binary 8 pulses are transmitted over the line 23. The same operation occurs at each machine digit cycle point to 0 with pulse blocking occurring where necessary, as previously described.

It can be seen that at 3, 2 and 1 digit cycle point time the bit count, if any, for each word is transmitted over the binary 2—1 lines and the line 23 along with the numeric data.

Thus, to read and process an entire line of numeric data, the entire line of data must be delivered to the translator ten times, once for each machine digit cycle point. Likewise, it is to be observed that using the numeric data given in the example, Figs 3a and 3b, the line 23 is serially pulsed at each decimal cycle point in a manner which starts at the left-hand portion of the diagram and following to the right serially from the 9 through 0 digit cycle point positions.

Figs. 4a and 4b illustrate the time feature of a machine digit cycle point with respect to the time required to supply the entire line of numeric data from the storage device. The 9 machine cycle point is shown and this represents a time interval of 8.9 milliseconds of active time at the cycle point or a total of 16.6 milliseconds between machine cycle digit points. The time required to transmit the entire line of numeric data to the translator is 1.0008 milliseconds. Thus it can be seen that as far as sending data from the storage device precise timing is not necessary because the printer is capable of receiving information at any time during 8.9 millisecond interval. However, the pulse should be received early in the cycle point in order to allow time for an inductive use in the print magnets, not shown.

Also shown on this diagram are three groups of pulses which are 4 micro-seconds in duration. The second group represents shift pulses which are used to step the matrix 24, Fig 2, in a predetermined manner. These shift pulses are also divided into groups of seventeen pulses each group separated by a space and are equivalent to the pulses representing the numeric data as shown in Figs. 3a and 3b, one pulse for each ordered position in the line. Directly above the shift pulses is a line of gate pulses which are 180° out of phase. These gate pulses are supplied over the line 113 to the diode switch 83, Fig. 2, continuously during the entire machine operation and permit the positive pulsing of the word switches 85 in the matrix 24 whenever the line 23 is pulsed by data leaving the translator 15. Below the shift pulses and in the ordered positions as shown in Figs. 3a and 3b, a single pulse is represented to show when the decimal 9 line is rendered positive by the binary 8—1 lines to pulse the output line 23.

The upper portion of Fig. 5 diagrammatically shows the machine cycle points 9 through 0 along with the time intervals between points and a relative representation of the time intervals between points and a relative representation of the time required to receive the numeric information from the storage source. From this diagram it can readily be seen that the numeric information is supplied serially to the translator once for each machine cycle point. After the data has been delivered at any digit cycle point, the calculator has approximately 15 milliseconds before the next cycle point, therefore, it is free to continue calculator operation during this interval, plus the entire time the printing operation is taking place. The printer and calculator are interlocked so that calculations are discontinued during transfer of data or values to the printer.

Referring to Fig. 2, the matrix 24 includes a plurality of heated cathode type gas filled tubes or print thyratrons, not shown, which are arranged in seven horizontal rows and seventeen vertical columns. A 17 position closed or fast ring 86, is provided for driving the vertical columns and an open or slow 7 position ring 88, drives the horizontal rows and the combination word switch 85 connected to each row. The detail description of this matrix and its operation is shown and described in the above Shafer application Serial Number 469,592.

Each horizontal row represents a word 1 through 7 in the example given and each verticle column represents an ordered position 1 through 17 in each word at the points of intersection. Thus all 112 ordered positions of the entire line of data are represented, plus the bit count positions. With this arrangement, there is provided one gas tube for each ordered position in the line to be printed.

In order to supply the positive drive to the control grids of the print magnet operating gas tubes, the 17 position closed drive ring 86, is driven by the previously mentioned shift pulses supplied to a terminal 96 from the external source along a shift pulse line 97 in definite timed relation under the control of suitable control means.

The means for providing the positive pulses to the word switches includes the previously-mentioned diode switch 83 which has one terminal connected to the single line 23 coming from the translator 15 and another terminal 113 connected to the source of previously-mentioned gate pulses shown in Fig. 4. As mentioned, these gate pulses are inverted shift pulses of 4 microsecond duration and are continuously supplied to the diode switch 83 during the entire operation of the printer. Thus with continuous gate pulses applied to one portion of the diode switch 83 whenever a pulse is transmitted from the translator along the line 23, the combination applies a positive pulse along the line 84 to the word switches 85 to condition one diode of each word line.

In operation of the matrix, the word ring 88 is normally reset with all triggers Off and the vertical drive ring 86 is reset with all triggers Off, except the first which is reset On. Upon the application of a negative control pulse along a conductor 115 which is dependent upon the proper operating conditions to be later explained, the slow ring 88 is turned On and this provides a positive level at the first word diode switch, while the remaining word lines remain negative. At a pulse after the word trigger is turned On, the first shift pulse on the shift pulse line 97 is gated to the vertical ring 86 to shift the normally On first trigger to its Off position.

As each 4 micro-second shift pulse is applied to the vertical ring 86, it will turn the particular trigger which is On to its Off position and such action in turn turns the next succeeding trigger On in a stepping manner. After the seventeenth shift pulse is applied to the vertical drive ring 86, the negative going output completes the loop. At this time a positive potential on a conductor shifts the row or open ring 88 to its next position.

From the foregoing it should be understood that the operation of the horizontal and vertical drive rings 88 and 86, respectively, for the matrix 24 is timed in synchronism with the delivery of information to the translator over the 1—2—4—8 binary lines by means of the shift and gate pulses. By way of example, assume the first binary value of the first word supplied to the translator is a 9 and that the emitter 21, Fig. 14a, is in its 9 digit cycle point position, indicating the start of a line of information, a negative pulse is developed on the line 23 which is rendered positive by the power amplifier 81, Fig. 14b, and is timed with the gate pulses applied to the diode switch 83, Fig. 2. This results in a positive pulse applied to the first word switch over the conductor 84 and results in a positive pulse being applied to all grids of the first row of gas tubes. Under these conditions only the first tube in the first word row and first column has applied thereto two positive pulses, while the other tubes have only one positive value each. Thus the first tube is fired and will conduct while the other tubes remain inactive.

With both the translator 15 and matrix 24 synchronized, it can be further seen that with the emitter at its 9 machine cycle point position and the consecutive sweeping of the gas tubes with the positive pulses, at any point where a binary 9 pulse is picked up at the decimal 9 line in the translator 15, the gas tube where positive coincidence occurs with the vertical sweep is fired. This acts to set up the printing of a numeral 9 in the selected printer. With the emitter at the 9 machine digit cycle point, the matrix 24 completes one cycle, that is, each ordered position of each word has been consecutively scanned and all 9's in each word result in firing of the related gas tube in its proper ordered position.

The same procedure is followed when the emitter is in its 8 machine cycle point position and the matrix is again operated in the same sequence starting with word line 1 column 1 and all of the gated 8's act to fire the related gas tubes in a like manner.

For the purpose of this description, it will be assumed that the printers are in full operation and that the various potentials necessary for machine operation are all supplied from suitable sources.

Fig. 2 shows in block diagram form the conditioning circuitry for printer operation and the controlling circuits for entry of data into the print thyratron matrix.

In order for the printers to receive the data from the storage device over the binary 1—2—4—8 lines, the printers must be in their proper cycle point positions to receive such data, and other conditions must be met; that is, the printers must be operative, a ready signal must be sent to the calculator, a selection for printer A or B must be made and the proper circuit checking must be accomplished which operates with a control pulse when the machine is at its proper machine digit cycle point to transmit a digit cycle point or row signal to the calculator to indicate that everything is in order to receive the data. When all these conditions are satisfactorily met, the data from the storage device is transmitted to the translator 15, groups of shift pulses are delivered to the shift pulse terminal 96 and gate pulses to the terminal 113.

Since the printers are freely running, as the emitter 21, Fig. 14a, reaches 9 machine digit cycle point time, its related cam contact C131a closes to apply a positive potential over the decimal 9 line to turn the trigger T4—9 On. This positive potential extends to the diodes of this line and at the same time provides a positive potential over the conductor 196 to condition the final element of the diode switch 157, Fig. 2. The output from this switch continues through the diode mix 159 and over the conductor 161 to turn the "ready-to-print" trigger 163 On. As this trigger turns On, a positive potential is applied to one element of the digit point diode switch 165 and to the shift pulse diode switch 197.

As the positive potential was applied to the conductor 196 to condition the diode switch 157 a similar potential extending from the diode mix 76, Fig. 14a, applies the same positive potential over the conductors 198 and 201, Fig. 2, to condition the digit diode switch 165 and another element of the shift pulse diode switch 197.

At this time, the switch 165 conducts over the conductor 115 and turns the word ring 88 On. At the same time the digit cycle point terminal 209 applies a positive potential to the calculator, this indicates that the printer is in its proper cycle point position to receive the entire line of data serially.

Upon the reception of this signal, the calculator, at its first opportunity, serially transmits the entire line of data as set forth in Figs. 3a and 3b over the binary 1, 2, 4 and 8 lines 19, 18, 17 and 16, respectively, to the translator 15, Fig. 14b. With the emitter 21, Fig. 14a, on decimal 9 line, his line is positive and any combination of 8 and 1 pulses arriving simultaneously will condition the diode switch in this line to gate or cause conduction or apply a positive potential to the related amplifier 79. As the amplifier conducts, the line 23 goes negative which feeds to the power amplifier 81 whose output is connected to the cathode follower 82. Thus, a negative output on the line 23 adjacent the translator results in a positive output to the gate pulse diode switch 83, Fig. 2. Along with the delivery of the line of data from the calculator, in the form of binary code, are a continuous series of 4 micro-second gate pulses which are applied to the terminal 113 to condition the other element of the diode switch 83 for conduction whenever a pulse representing a decimal digit is fed over the line 23.

Along with the delivery of the gate pulses to the terminal 113 are a series of inverted shift pulses which are applied at the terminal 96, Fig. 2, and represent an ordered position for each word. In this example, the shift pulses are fed from the calculator in groups of seven words having seventeen shift pulses per word with a total of twelve micro-seconds delay between each word. These shift pulses condition the shift pulse diode switch 197 and feed over the conductor 97 to the closed vertical or fast ring 86.

During this interval, the first group of seventeen shift pulses are delivered and as the next group of seventeen shift pulses for word 2 arrive, the shift pulse or fast ring 86 is stepped along in an identical manner and at the end of the seventeenth pulse, the second word trigger in the slow ring 88 is turned Off and in so doing turns On the third word trigger. Thus, during the transfer when each word line is turned On in the slow ring, the shift pulse ring 86 makes one complete cycle and in doing this provides the means for stepping along the word ring 88.

Under these conditions, all decimal 9's in each word are removed and due to timing of the fast ring 86 by the shift pulses, which bear a definite relation to the ordered position of each numeric value, the related gas tube in the same ordered position is fired to set up in the exact ordered position.

As the emitter 21 leaves the decimal 9 line position, the diode switches 165 and 197 are biased negative over the lines 198 and 201 to prevent the arrival or passing of shift pulses. When the emitter moves to its decimal 8 line position, the trigger T4—8, Fig. 14a, is turned On and the diode mix 76 again conducts over the lines 198 to condition the diode switches 165 and 197, Fig. 2, to conduct in an identical manner. This action operates to again turn the first word trigger and at the same time apply a positive digit cycle point potential to the terminal 209 directed to the calculator. This latter signal signifies the printer is at its next or decimal 8 cycle point position and that the calculator can now transmit the same entire line of data to the translator 15. During this interval, the 8 line is positive while the other lines are negative, thus only pulses representing a binary 8 are removed or gated from the group of words and transmitted to the matrix to fire the proper gas tubes where coincidence of the positive values occurs between the two grids. All 8's in the binary 9 code are separated from the 8's by means of the inverter P1 in the line 19b, as previously described under the translator operation.

The translator and matrix operation and timing is identical for all decimal positions.

After the entire line of information has been fed to the translator a total of ten times and all of the proper numeric values are set up, the "ready-to-print" trigger 163 and print A trigger 145 are turned Off. This completes the cycle and signifies to the calculator by a positive potential applied by the terminal 172 that all of the information has been received and that the printers are now ready to receive the next instruction.

From the foregoing, it can be seen that an improved means has been provided for receiving data in binary code from a calculator or storage device which is capable of translating this data to decimal values and to operate related equipment in accordance with the values received.

While there have been shown and described and pointed out the fundamental novel features of the invention as applied to a preferred embodiment, it will be understood that various omisisons and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a translator for translating a combinational code to a second code in which each value is represented by a single code element; a plurality of parallel lines, one for each of said single code elements; a plurality of translator input lines, one for each element of said combinational code; and means interconnecting said parallel lines and said input lines so that for each of said parallel lines there is a unique combination of pulse and nonpulse states on said input lines which predicates a predetermined shift of voltage on said parallel line, said last means including means responsive to pulses on at least one of said input lines to inhibit said voltage shift on one or more of said parallel lines.

2. A translator as claimed in claim 1, including means to bias said parallel lines in sequence to a preparatory voltage level, and output means for each of said parallel lines rendered effective by coincidence of the preparatory voltage level and the voltage shift caused by the combination of pulse and nonpulse states on said input lines which is unique to the particular parallel line.

3. In a translator having a single line output for translating a combinational code to a second code in which each value is represented by a single code element, the combination of a plurality of parallel lines, one for each of said single code elements, all of said lines being connected to said output, an emitter associted with said parallel lines to consecutively condition the same, a plurality of translator input lines, one for each element of said combinational code over which data is serially transmitted by means of pulses or simultaneous combinations of pulses, means for connecting said input lines to said parallel lines in a predetermined manner to provide the proper equivalent second code value for each pulse or combination of input pulses, and means controlled by the pulses delivered to each of said conditioned parallel lines for blocking the gating of all input pulses from said translator input lines not having the equivalent second code value at said conditioned line and for gating the proper input pulses over the equivalent and conditioned parallel line as a single pulse applied to said single line output.

4. In a translator having a single line output for translating a combinational code to a second code in which each value is represented by a single code element, the combination of a plurality of parallel lines, one for each of said single code elements, all of said lines being connected to said output, an emitter associated with said parallel lines to consecutively condition the same positive, a plurality of parallel translator input lines, one for each element of said combinational code for serially transmitting a line of data in the form of positive and no pulses over separate input lines, a plurality of first diode switches interconnecting said parallel and input lines in a predetermined manner to provide the proper equivalent second code value for each combination of input pulses and no pulses, said first switches cooperating with said input lines to direct a pulse over said conditioned parallel line when the numeric value transmitted is equal to the particular conditioned second code line, and a plurality of second diode switches interconnecting said parallel and input lines and responsive to the application of improper combinations of simultaneous positive and no pulses transmitted over said input lines to bias the conditioned parallel line negative, all of said parallel lines over which the translated equivalent values are serially transmitted, as each consecutive parallel line is conditioned, being connected to said single line output.

5. The combination as claimed in claim 4, including certain of said second diode switches connected to a certain one of said parallel lines to direct a pulse over said certain one of said parallel lines, upon conditioning by said emitter, when a simultaneous no pulse condition exists on all of the parallel input lines.

6. In a binary to decimal translator, the combination of a plurality of parallel lines having decimal values 0–9, means including a trigger in each line, respectively, for selectively conditioning a selected line, a plurality of multielement diode switches, one for each line, a plurality of parallel binary lines over which a line of data is serially transmitted in binary 1—2—4—8 code by combinations of pulse and no pulse conditions, means for selectively connecting said binary lines to said decimal lines through an element of said switches to energize said lines respectively positive when selectively conditioned by its trigger to thus provide an indication of the proper equivalent decimal value, and means connected between another element in each switch and selected binary lines to bias the conditioned decimal line negative whenever an improper combination of binary pulse and no pulse conditions is impressed.

7. In a binary to decimal translator, the combination of a plurality of parallel lines having decimal values 0–9, means including a trigger for conditioning a selected line for conduction, a plurality of multielement diode switches, one for each line, a plurality of binary code lines having values 1—2—4—8 over which a line of data having variable numeric values in each ordered position is serially transmitted as a pulse or combination of pulses, means for selectively connecting said binary lines to said decimal lines through an element of said switches and effective upon conditioning of a selected line by said trigger to provide the proper equivalent decimal values, means connected between said binary lines and said switches for biasing said conditioned decimal line upon the application of unequivalent binary pulses to block conduction of the line and for permitting the gating therefrom when the proper binary pulse or pulses are applied to the line, and a common conductor for all said decimal lines over which all gated pulses are serially transmitted from each decimal line.

8. In a binary to decimal translator, the combination of a plurality of parallel lines having decimal values 9–0 and including input and output ends, means for consecutively conditioning said lines from their input ends, a common conductor for the output ends of said lines, means for blocking feedback from said common conductor to said parallel lines, a plurality of parallel binary code lines having 1—2—4—8 values over which a line of numeric data is serially transmitted by pulses and combinations of simultaneous pulses, means for selectively connecting said binary lines to the decimal lines and effective upon conditioning of a selected line by said first-named means to provide an equivalent decimal value for each combination of binary pulses, said last-named means including multielement diode switches for selectively interconnecting said decimal and binary lines, one of said diode switches being rendered conductive upon the application of the proper binary pulses to the conditioned decimal line to gate the same and produce a pulse on said common line, and means associated with said binary and decimal lines and an element of said diode switches for rendering the conditioned decimal line nonreceptive when improper binary pulses are applied thereto.

9. In a binary to decimal translator, the combination of a plurality of parallel lines having decimal values 0–9 and including input and output ends, means for consecutively conditioning said lines from their input ends, a common conductor for the output ends of said lines, means for blocking feedback from said common conductor to said decimal lines, a multielement diode switch disposed in each of said decimal lines, a plurality of binary lines over which a line of variable numeric data is serially transmitted in binary 1—2—4—8 code as a series of pulses and combination of simultaneous pulses to represent decimal values, means for selectively coupling combinations of said binary lines to said decimal lines through an element of said switches and effective upon conditioning of a selected line by said first-named means to provide the equivalent decimal value, and means including another element of said switches connected to said binary lines to render a conditioned decimal line nonreceptive when the improper binary pulses are applied thereto and permit gating thereover to apply a pulse to said common conductor when the correct binary pulses for the equivalent decimal value are applied to the conditioned decimal line, said binary lines being connected to the 0 decimal line through said last-named means to generate a pulse, upon conditioning by said conditioning means in the absence of binary pulses on said binary lines.

10. In a binary to decimal translator, the combination of a plurality of parallel lines having decimal values 0–9 and including input and output ends, an emitter for consecutively conditioning said lines from their input ends, a common conductor for the output ends of said lines, means for blocking feedback from said common conductor to said decimal lines, a multielement diode switch disposed in each of said decimal lines, a plurality of parallel binary 1—2—4—8 lines over which a line of variable numeric data is serially transmitted in binary code as a series of pulses and combination of simultaneous pulses to represent decimal values, means for selectively securing combinations of said binary lines to said decimal lines through an element of said switches to provide the equivalent numeric value, and means including another element of said switches connected to said binary lines to render a conditioned decimal line nonreceptive when the improper binary pulses are applied thereto and permit gating thereover to apply a pulse to said common conductor when the correct binary pulses for the equivalent decimal value are applied to the conditioned decimal line, said binary line delivering the entire line of coded data serially at each decimal line whereat all like numeric values are serially gated to said common conductor before the next succeeding decimal line having a different decimal value is conditioned for conduction.

11. In a binary to decimal translator, the combination of a plurality of parallel lines having decimal values 9–0 and including output ends, a trigger disposed in each decimal line to maintain said line nonconditioned, a cyclically operable emitter for consecutively operating said triggers to condition its related decimal line, means for consecutively operating said triggers to render its related line nonconditioned, a multielement diode switch connected in each of said decimal lines to limit conduction thereover to preselected conditions, a plurality of parallel binary 1—2—4—8 lines over which a line of numeric data is serially transmitted as pulses or combinations of simultaneous pulses to represent decimal values, said binary lines being selectively connected to said decimal lines through an element of the switches in said decimal lines and effective upon consecutive conditioning of a line by operation of said trigger to provide the equivalent numeric value thereon, means for tying the output ends of said decimal lines to a common conductor, an amplifier between each decimal line and said common conductor for preventing feedback from said common conductor to said respective decimal lines, and means parallel connected to said binary lines and connected through another element of said diode switches to said decimal lines for rendering the conditioned decimal line nonreceptive when an improper binary pulse is applied to said line and to bias the line positive when the proper binary pulse is applied to said line to thereby gate a pulse to the amplifier in said conditioned decimal line, said amplifier providing a negative output over said common conductor for each gated decimal value on the conditioned decimal line.

12. In a binary to decimal translator, the combination of parallel decimal lines having values 9–0 and including input and output ends, a trigger disposed in each line at the input end to normally bias the same negative, a cyclically operable emitter for consecutively operating said triggers to bias its related line positive, cyclically operable means for consecutively returning said trigger to its original position, a multielement diode switch means in each decimal line to permit conduction at the output end of each line when biased positive, a plurality of parallel binary 1—2—4—8 code lines over which a line of numeric data is serially transmitted by pulses and combinations of simultaneous pulses representing digit values 9–1, means for selectively connecting said binary lines to said decimal lines through an element of said diode switch means to provide a positive output by the equivalent decimal line upon the application of proper pulses, means for connecting the output ends of said decimal lines to a common conductor, means associated with each decimal line to block feedback from said common conductor to other decimal lines, and means including an inverter connected to each binary line and to preselected elements of said diode switch means in said decimal lines to apply a positive bias to the selected decimal line to condition the same for conduction when said related binary line is negative and to apply a negative potential to said connected decimal lines when said related binary line is positive to limit the gating of improper combinations of pulses representing other decimal values over the conditioned decimal line.

13. A binary to decimal translator as claimed in claim 12, whereby each inverter connected to said binary lines has a connection to said decimal 0 line to bias the same positive, when conditioned by its related trigger, in the absence of binary pulses transmitted over said binary lines.

14. In a binary to decimal translator, the combination of a plurality of parallel decimal lines having values 9–0 and including input and output ends, a normally Off trigger disposed at the input of each decimal line to bias the same negative, a cyclically operable emitter for consecutively turning said triggers On to bias the related decimal line 9–0 positive, cyclically operable trigger control means for consecutively turning the On trigger Off in the same order, a multielement diode switch in each line to limit conduction at the output end of the same, a common conductor secured to each decimal line, an inverter at the output end of each decimal line for blocking feedback from said common conductor, a plurality of parallel 1—2—4—8 binary code lines over which a line of numeric data is serially transmitted by pulses and combinations of simultaneous pulses representing digit values 9–1, means for connecting said binary lines to said decimal lines through an element of each preselected diode switch, said binary 1 line being connected to said decimal 9, 7, 5, 3, and 1 lines, said binary 2 line being connected to said decimal 7, 6, 3, and 2 lines, said binary 4 line being connected to said decimal 7, 6, 5, and 4 lines, and said binary 8 line being connected to said decimal 9 and 8 lines, a second set of parallel lines, one each connected to said binary code lines and to another element of each preselected diode switch to provide second binary lines, said second binary 1 line being connected to said decimal 8, 6, 4, 2, and 0 lines, said second binary 2 line being connected to said decimal 5, 4, 1, and 0 lines, said second binary 4 line being connected to said decimal 3, 2, and 1 lines, and said second binary 8 line being connected to said binary 1 and 0 lines, an inverter disposed in each of said second binary lines between said first binary line and said decimal lines, said inverters providing a positive bias to said decimal lines connected thereto in the absence of a positive pulse on the related binary line and a negative pulse to the connected decimal lines when the related binary line is rendered positive, said negative pulse limiting the gating of binary pulses over the conditioned decimal line having improper decimal equivalent values, said inverters providing a positive value to said decimal 0 line when all of the binary lines are negative, and means including an inverter connected to each decimal line for applying a negative pulse to said common conductor when the conditioned decimal line conducts, said binary lines delivering the entire line of data to said translator once for each decimal line in timed relation to the conditioning by said triggers.

References Cited in the file of this patent
UNITED STATES PATENTS

| | | |
|---|---|---|
| 2,697,549 | Hobbs | Dec. 21, 1954 |
| 2,758,787 | Felker | Aug. 14, 1956 |
| 2,808,984 | Marshall, et al. | Oct. 8, 1957 |